US012603011B2

(12) United States Patent (10) Patent No.: US 12,603,011 B2
True et al. (45) Date of Patent: Apr. 14, 2026

(54) LANDING GUIDANCE FOR AIR VEHICLES USING NEXT GENERATION CELLULAR NETWORKS

(71) Applicant: Honeywell International Inc., Charlotte, NC (US)

(72) Inventors: Willard R. True, Kirkland, WA (US); Donald C. Kauffman, Laurel, MD (US)

(73) Assignee: Honeywell International Inc., Charlotte, NC (US)

( * ) Notice: Subject to any disclaimer, the term of this patent is extended or adjusted under 35 U.S.C. 154(b) by 434 days.

(21) Appl. No.: 17/958,151

(22) Filed: Sep. 30, 2022

(65) Prior Publication Data

US 2024/0112587 A1 Apr. 4, 2024

(51) Int. Cl.
G08G 5/02 (2006.01)
B64D 45/04 (2006.01)
G08G 5/54 (2025.01)

(52) U.S. Cl.
CPC .............. G08G 5/54 (2025.01); B64D 45/04 (2013.01)

(58) Field of Classification Search
CPC ................................ G08G 5/025; B64D 45/04
See application file for complete search history.

(56) References Cited

U.S. PATENT DOCUMENTS 8,725,175 B2 * 5/2014 Altman ................... H04L 51/58
455/457
9,499,265 B2 * 11/2016 Sanz ......................... B64F 1/02
(Continued)

FOREIGN PATENT DOCUMENTS

WO 2019210962 A1 11/2019
WO 2020020460 A1 1/2020
(Continued)

OTHER PUBLICATIONS

Yuan Qiu, Jianwei Niu, Xinzhong Zhu, Kuntuo Zhu, Yiming Yao, Beibei Ren and Tao Ren, "Mobile Edge Computing in Space-Air-Ground Integated Networks: Architectures, Key Technologies and Challenges", Sep. 22, 2022, Journal of Sensor and Actuator Networks, pp. 1-46 (Year: 2022).*
(Continued)

*Primary Examiner* — Peter D Nolan
*Assistant Examiner* — Demetra R Smith-Stewart
(74) *Attorney, Agent, or Firm* — Fogg & Powers LLC

(57) ABSTRACT

A landing guidance system comprises at least one edge node that operatively communicates with a mobile communications network, wherein the mobile communications network includes a network location management function, and at least one processor onboard an air vehicle, the at least one processor in operative communication with the edge node.
(Continued)

The at least one edge node is operative to provide landing guidance information to the air vehicle by a method that comprises receiving location information from the network location management function; generating the landing guidance information for the air vehicle based on the location information; and transmitting the landing guidance information to the air vehicle when the landing guidance information meets a reliability threshold. The at least one processor is operative to guide the air vehicle to the landing target area using the landing guidance information.

18 Claims, 9 Drawing Sheets

(56) References Cited

U.S. PATENT DOCUMENTS

| | | | |
|---|---|---|---|
| 9,851,716 | B2 | 12/2017 | Kugelmass |
| 10,913,532 | B2 | 2/2021 | Carthew et al. |
| 11,405,801 | B1 * | 8/2022 | Qureshi ................ H04W 16/26 |
| 11,895,508 | B1 * | 2/2024 | Qureshi ................ B64C 39/024 |
| 2016/0011318 | A1 * | 1/2016 | Cohen ..................... G01S 19/05 |
| | | | 342/357.68 |
| 2017/0251368 | A1 * | 8/2017 | Ross ..................... H04W 12/03 |
| 2020/0043348 | A1 * | 2/2020 | Ghosh .................. G01C 21/005 |
| 2020/0201360 | A1 * | 6/2020 | Blonder ................ B64U 70/95 |
| 2020/0349852 | A1 | 11/2020 | DiCosola |
| 2020/0394928 | A1 | 12/2020 | Neubauer et al. |
| 2021/0084551 | A1 | 3/2021 | Kaneda et al. |
| 2021/0089055 | A1 * | 3/2021 | Tran ...................... B64U 10/30 |
| 2021/0099969 | A1 | 4/2021 | Poscher et al. |
| 2021/0232144 | A1 * | 7/2021 | Lee ........................ H04W 72/23 |
| 2023/0216800 | A1 * | 7/2023 | True ........................ H04L 67/12 |
| | | | 370/235 |

FOREIGN PATENT DOCUMENTS

| | | | |
|---|---|---|---|
| WO | 2021032956 | A1 | 2/2021 |
| WO | 2021079108 | A1 | 4/2021 |
| WO | WO-2022021997 | A1 * | 2/2022 ......... H04L 41/0823 |

OTHER PUBLICATIONS

Zhenyu Xiao, Lipeng Zhu, Xiang-Gen Xia, UAV Communications with Millimeter-Wave Beamforming: Potentials, Scenarios, and Challenges, Sep. 2020,China Communications, pp. 147-166 (Year: 2020).*

European Patent Office, "Partial European Search Report", dated Feb. 26, 2024, from EP Application No. 23196610.2, from Foreign Counterpart to U.S. Appl. No. 17/958,151, pp. 1 through 14, Published: EP.

Jian et al., "Automatic Landing Control of UAV based on Optical Guidance", 2012 International Conference on Industrial Control and Electronics Engineering (ICICEE), Aug. 23, 2012 pp. 152 through 155.

European Patent Office, "Extended European Search Report", dated May 17, 2024, from EP Application No. 23196610.2, from Foreign Counterpart to U.S. Appl. No. 17/958,151, pp. 1 through 11, Published: EP.

* cited by examiner

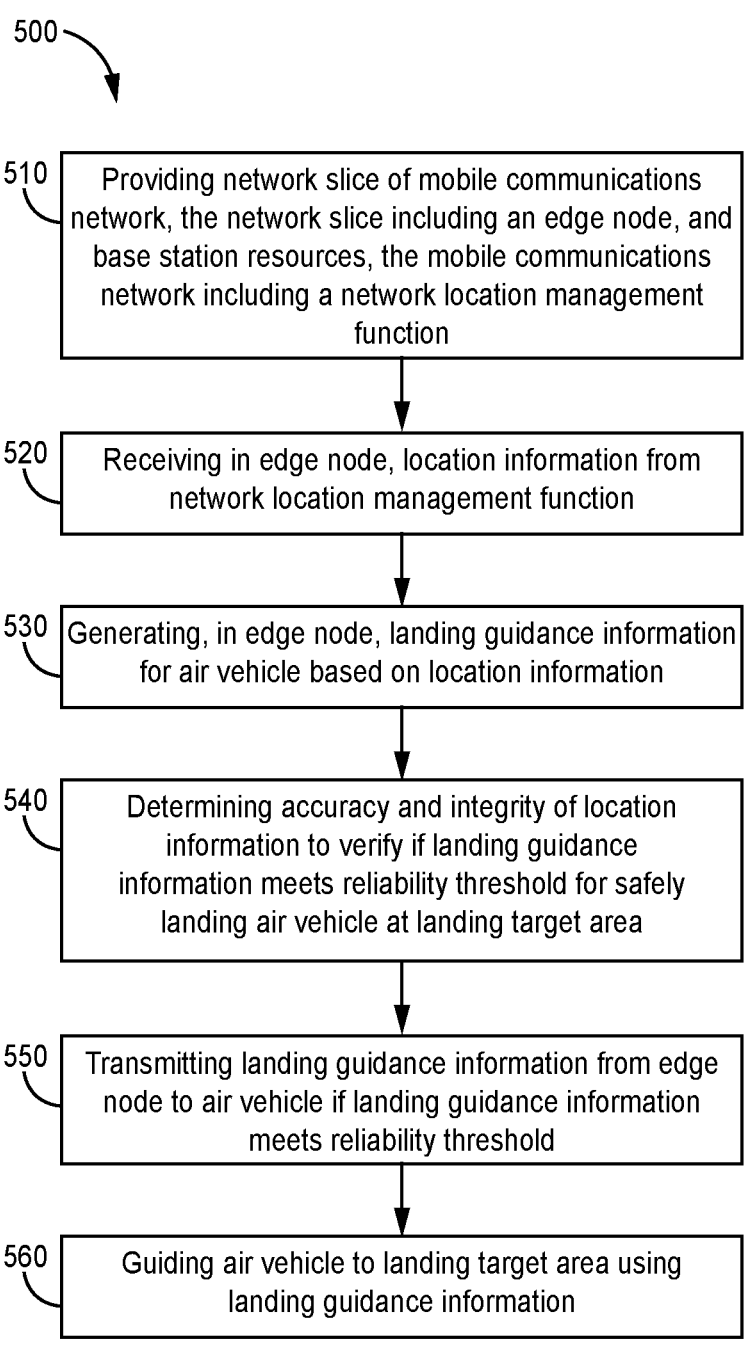

500

510 — Providing network slice of mobile communications network, the network slice including an edge node, and base station resources, the mobile communications network including a network location management function 520 — Receiving in edge node, location information from network location management function 530 — Generating, in edge node, landing guidance information for air vehicle based on location information 540 — Determining accuracy and integrity of location information to verify if landing guidance information meets reliability threshold for safely landing air vehicle at landing target area 550 — Transmitting landing guidance information from edge node to air vehicle if landing guidance information meets reliability threshold 560 — Guiding air vehicle to landing target area using landing guidance information

FIG. 5A

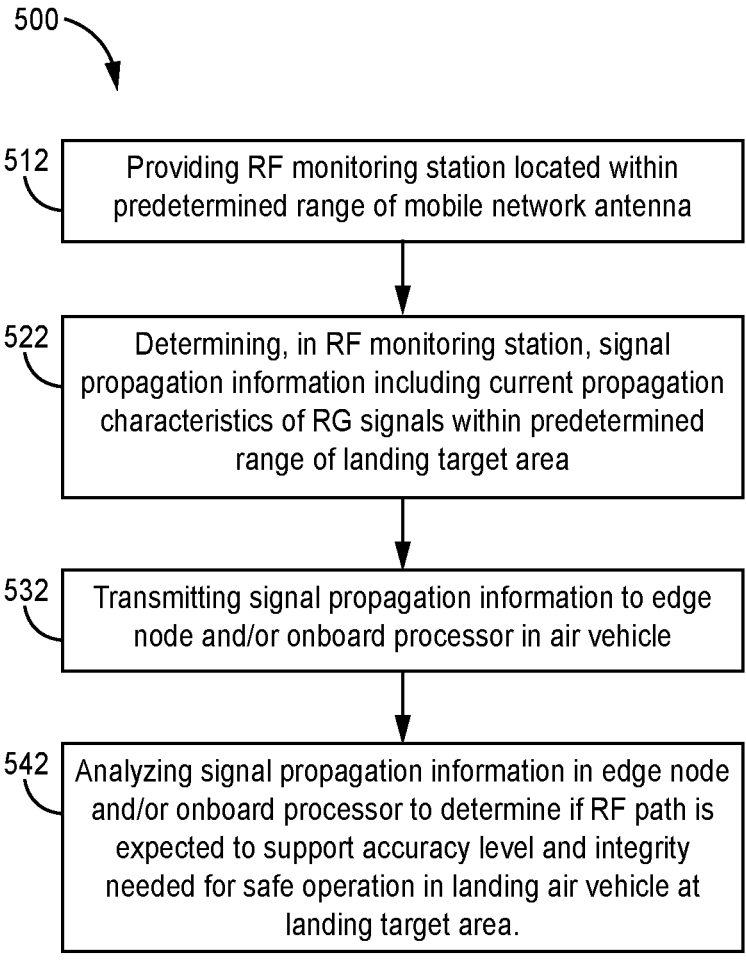

500

512 — Providing RF monitoring station located within predetermined range of mobile network antenna 522 — Determining, in RF monitoring station, signal propagation information including current propagation characteristics of RG signals within predetermined range of landing target area 532 — Transmitting signal propagation information to edge node and/or onboard processor in air vehicle 542 — Analyzing signal propagation information in edge node and/or onboard processor to determine if RF path is expected to support accuracy level and integrity needed for safe operation in landing air vehicle at landing target area.

FIG. 5B

LANDING GUIDANCE FOR AIR VEHICLES USING NEXT GENERATION CELLULAR NETWORKS

BACKGROUND

Next generation aircraft, such as Advanced Air Mobility (AAM) vehicles, Unmanned Air Systems (UAS), and Urban Air Mobility (UAM) vehicles, have the capability to operate outside of traditional airports. For example, air taxi services may operate in vertiports in urban areas and package delivery services may need to approach and land in completely undeveloped locations.

The next generation cellular networks, such as 5G, will introduce improved location services using mmWave high band signals. Such location services will use high band beam forming and mimo antennas to provide decimeter accuracy. These location services could be used "as-is" for some air vehicle navigation purposes. However, autonomous and/or low-visibility landings require high accuracy, continuity, and integrity, which the basic 5G location services may not always be able to provide.

SUMMARY

A landing guidance system comprises at least one edge node that operatively communicates with a mobile communications network, wherein the mobile communications network includes a network location management function, and at least one processor onboard an air vehicle, the at least one processor in operative communication with the edge node. The at least one edge node is operative to provide landing guidance information to the air vehicle by a method that comprises receiving location information from the network location management function; generating the landing guidance information for the air vehicle based on the location information; and transmitting the landing guidance information to the air vehicle when the landing guidance information meets a reliability threshold. The at least one processor is operative to guide the air vehicle to the landing target area using the landing guidance information.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIG. 5A is a flow diagram of a landing guidance method for an air vehicle, according to one implementation;

FIG. 5B is a flow diagram of further operational steps when RF integrity monitoring is employed in the landing guidance method of FIG. 5A;

DETAILED DESCRIPTION

Figure 1:
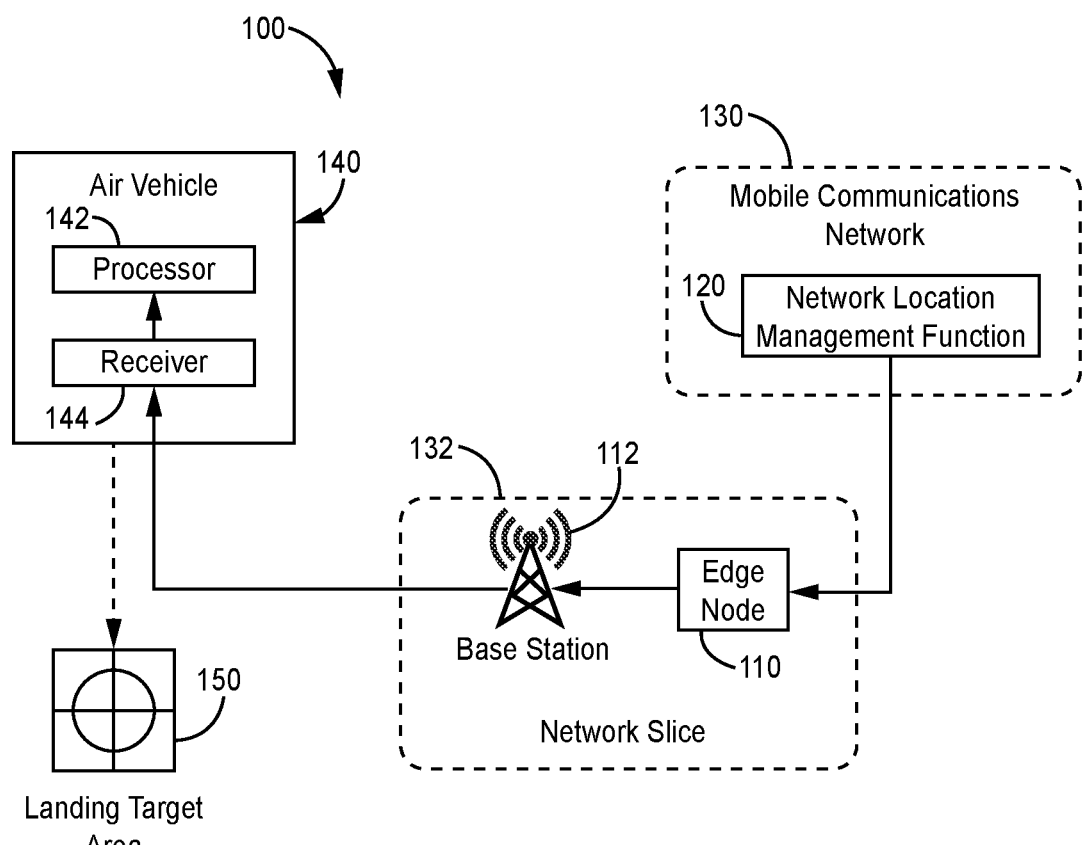
FIG. 1 is a block diagram of a landing guidance system for an air vehicle, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method of landing guidance for air vehicles using next generation communication networks, such as fifth generation (5G) cellular networks, is described herein.

The present approach provides a landing guidance solution that leverages the expanding next generation cellular networks, such as 5G networks, and does not rely on traditional, expensive landing systems. For example, the present system and method build on the basic capabilities of 5G networks and add the necessary components to meet the accuracy and integrity requirements for landing air vehicles, which would not be met with off-the-shelf 5G location services.

The present system and method can be implemented by adding edge node processing and a dedicated network slice, to provide the necessary accuracy, continuity, and integrity to landing operations for various types of manned or unmanned aircraft or air vehicles. In the present method, air vehicle location data is captured, and location integrity data is generated. Both types of data may be stored onboard the air vehicle, and/or in components within the network, or as cloud storage.

Network slicing is a network architecture that allows for multiplexing of virtualized and independent logical networks on the same physical network infrastructure. Each network slice is an isolated end-to-end network tailored to fulfil diverse requirements requested by a particular application. The 5G cellular network standards enable network slicing, which enables unique network protocols to operate over the 5G radio frequency channels.

Air vehicles may use any number of en-route navigation systems to approach a landing destination (e.g., a vertiport), such as satellite, radio, or visual navigation systems. However, these en-route navigation systems are not likely to provide sufficient location accuracy for safely landing the air vehicle. For example, at one location of the air vehicle approach to a vertiport, the air vehicle can begin searching for the landing location by using the landing location correction system disclosed herein. If the landing location correction system is providing a sufficient quality of information for a safe landing, the air vehicle can switch from the en-route navigation system to the present correction system for determining the landing location corrections until touchdown. Due to any number of environmental factors, which may affect quality of the landing information, the air vehicle can continue to use the en-route navigation system while continuing to assess the quality of the landing location correction system. If the quality of the landing location correction system required for a safe landing has not been reached by the time the air vehicle reaches a landing decision location, the landing location correction system will alert a pilot that a safe landing guidance signal is not available.

Exemplary aircraft or air vehicles that can use the present landing guidance system and method include Advanced Air Mobility (AAM) vehicles, Unmanned Air Systems (UAS), Urban Air Mobility (UAM) vehicles, vertical take-off and landing (VTOL) vehicles, Unmanned Aerial Vehicles (UAVs), or the like.

Further details related to the present landing guidance system and method are described as follows and with reference to the drawings.

FIG. 1 illustrates a landing guidance system 100, according to an exemplary embodiment. The landing guidance system 100 generally includes at least one edge node 110, which operatively communicates with a network location management function 120 of a mobile communications network 130. The edge node 110 also operatively communicates with at least one air vehicle 140, through a base station 112, to provide landing guidance information to air vehicle 140.

The edge node 110 can be part of a dedicated network slice 132 of mobile communications network 130, which can be implemented as a 5G network, for example. The edge node 110 can include one or more processing and data storage units. As part of network slice 132, edge node 110 has access to allocated resources in mobile communications network 130. For example, such allocated resources in a 5G network include mmWave beamforming antennas and radio channel selection.

The network location management function 120 is operative to provide location information. In one example, network location management function 120 can be a standard feature of mobile communications network 130, such as a 5G network, and can be managed by a mobile network operator. The network location management function 120 provides basic location information services for air vehicle 140.

The air vehicle 140 includes at least one onboard processor 142, such as a landing processor, which is coupled to a receiver 144 such as a radio receiver. The processor 142 is configured to receive landing guidance information from edge node 110 through receiver 144 via base station 112.

As described in further detail hereafter, edge node 110 is operative to generate the landing guidance information based on the location information from network location management function 120. In this exemplary implementation, edge node 110 determines the accuracy and integrity of the location information to verify if the landing guidance information is reliable enough for safely landing air vehicle 140 at a landing target area 150. In another implementation, onboard processor 142 can determine the accuracy and integrity of the location information to verify if the landing guidance information is reliable enough for safely landing air vehicle 140 at landing target area 150.

The edge node 110 then transmits the verified landing guidance information to processor 142 through receiver 144 in air vehicle 140. The processor 142 interfaces with air vehicle control electronics and/or a pilot to guide air vehicle 140 to landing target area 150 using the landing guidance information.

The deviations and feedback signals needed to control the landing of air vehicle 140 can be calculated in processor 142, providing for some degree of independence from the network. Alternatively, the deviations and feedback signals can be calculated on the ground at edge node 110, for example, to save Size, Weight and Power (SWaP) for a lightweight air vehicle.

Figure 2:
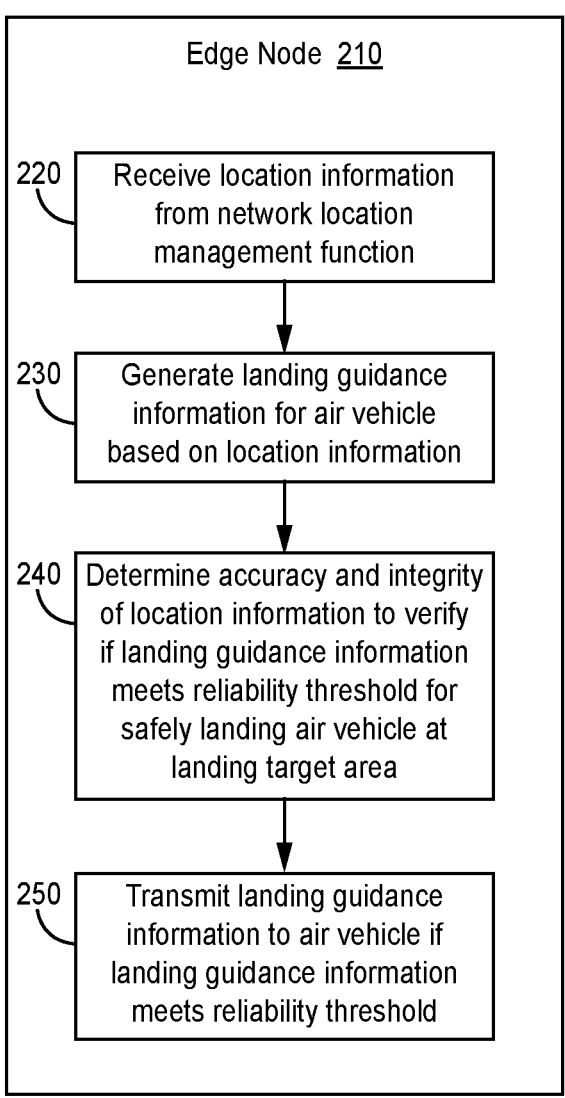
FIG. 2 is a flow diagram of an operation performed by an edge node used in a landing guidance system for an air vehicle, according to one implementation.

FIG. 2 illustrates an operation performed by an edge node 210, according to one implementation, which can be used in a landing guidance system for an air vehicle. The edge node 210 is operative to receive location information from the network location management function (block 220), and generate landing guidance information for the air vehicle based on the location information (block 230). The edge node 210 determines the accuracy and integrity of the location information to verify if the landing guidance information meets a reliability threshold for safely landing the air vehicle at the landing target area (block 240). The edge node 210 then transmits the landing guidance information to the air vehicle if the landing guidance information meets the reliability threshold (block 250).

Figure 3:
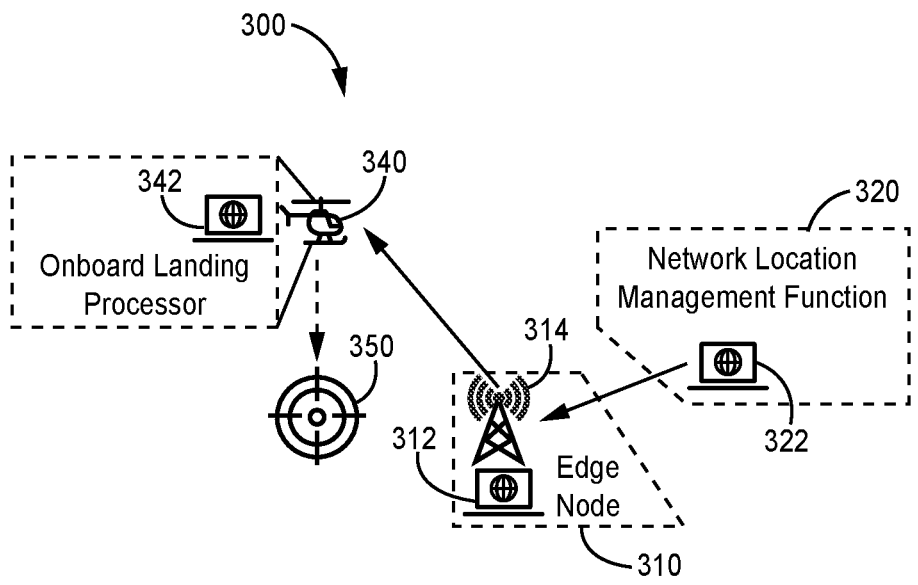
FIG. 3 is a block diagram of a landing guidance system for an air vehicle, according to an exemplary embodiment.

FIG. 3 illustrates a landing guidance system 300, according to one exemplary embodiment. The landing guidance system 300 generally includes an edge node 310, which operatively communicates with a network location management function 320 of a mobile communications network such as a 5G network. The edge node 310 also operatively communicates with an air vehicle 340, such as an AAM vehicle, UAS, UAM vehicle, VTOL vehicle, UAV, or the like, to provide landing guidance information.

In this example, edge node 310 is implemented as part of a network slice of the mobile communications network such as a 5G network. The edge node 310 includes one or more processing and data storage units 312. The edge node 310 is operatively coupled to at least one antenna of a base station 314, such as a mmWave beamforming antenna, and has access to a radio channel selection function.

The network location management function 320 includes one or more processing and data storage units 322, and provides basic location information services, such as described previously.

The air vehicle 340 includes at least one onboard processor 342, such as a landing processor, which is coupled to an onboard radio receiver. The processor 342 is configured to receive landing guidance information from edge node 310 via base station 314, which transmits a radio frequency (RF) signal to the radio receiver in air vehicle 340.

The edge node 310 is operative to generate the landing guidance information based on the location information from network location management function 320. The edge node 310 determines the accuracy and integrity of the location information to verify if the landing guidance information is reliable enough for safely landing air vehicle 340 at a landing target area 350. For example, edge node 310 is operative to determine the accuracy and integrity of the location information, to verify whether the landing guidance information meets a reliability threshold for safely landing air vehicle 340 at landing target area 350.

The edge node 310 transmits the verified landing guidance information, such as through high band mmWave signals, to air vehicle 340 for use by onboard landing processor 342. The processor 342 interfaces with air vehicle control electronics to guide air vehicle 340 to landing target area 350 using the landing guidance information.

While high band mmWave signals provided by 5G networks offer high accuracy for location, there are several limitations to this frequency range that a guidance system needs to address. One limitation is the relatively short range of these high band signals. This can be accommodated by using the longer range but less accurate mid band signals when the air vehicle is farther away from the landing site, and switching to high band signals for final approach and landing.

Another limitation is the sensitivity of the high band signals to weather conditions such as heavy rain. The basic mitigation for this limitation is the same as the mitigation described above for limited range. That is, the system may start in a lower frequency, longer range but less accurate band, when the vehicle is relatively farther away from the landing site, and switch to the more accurate high band when the vehicle is close enough to overcome the attenuation of the rain. This solution requires placing high band transmitters as close to the landing site as possible.

However, in extreme weather situations, even if the transmitter is located near the landing site it may not be possible to provide the necessary accuracy at the required distance from the landing site. One example would be if there are obstructions nearby that require high accuracy guidance to avoid. In this case, the edge node needs to be equipped with a monitoring function that can determine if the signals are currently able to propagate well enough to support the required accuracy at the necessary range.

Figure 4:
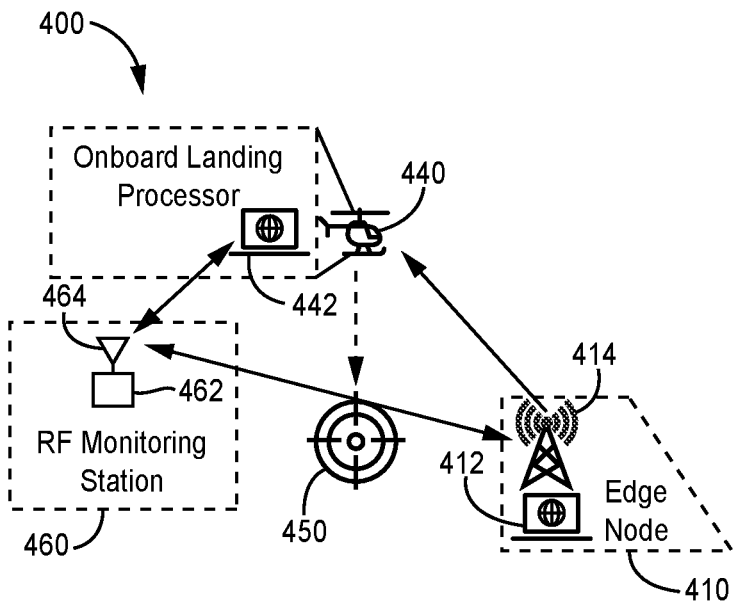
FIG. 4 is a block diagram of a landing guidance system with radio frequency (RF) integrity monitoring, according to another exemplary embodiment.

FIG. 4 illustrates a landing guidance system 400 that is provided with such a monitoring function, according to another exemplary embodiment. The landing guidance system 400 employs RF integrity monitoring, which is described further hereafter.

The landing guidance system 400 includes an edge node 410, which operatively communicates with a network location management function (not shown), such as in a 5G network, as described in previous embodiments. The edge node 410 also operatively communicates with an air vehicle 440, such as a AAM vehicle, UAS, UAM vehicle, VTOL vehicle, UAV, or the like, to provide landing guidance information.

In this example, edge node 410 is implemented as part of a network slice of a mobile communications network, such as a 5G network. The edge node 410 includes one or more processing and data storage units 412. The edge node 410 is operatively coupled to at least one mobile network antenna 414, such as a mmWave beamforming antenna, and has access to a radio channel selection function.

The air vehicle 440 includes at least one onboard processor 442, such as a landing processor, which is coupled to an onboard radio receiver. The processor 442 is configured to receive the landing guidance information from edge node 410 through antenna 414, which transmits a RF signal to the radio receiver in air vehicle 440.

The edge node 410 generates the landing guidance information based on the location information from the network location management function, as described in previous embodiments. The edge node 410 determines the accuracy and integrity of the location information to verify if the landing guidance information is reliable enough for safely landing air vehicle 440 at a landing target area 450.

An RF monitoring station 460 is located at a predetermined distance from mobile network antenna 414. The RF monitoring station 460 includes a signal processor 462, which is operatively coupled to an antenna 464 for receiving and transmitting RF signals. The RF monitoring station 460 is operative to monitor RF signal integrity, by determining the current propagation characteristics of RF signals within a predetermined distance from landing target area 450. Example propagation characteristics of the RF signals include received signal strength, and bit error rate.

The RF monitoring station 460 provides the propagation characteristics of the RF signals as signal propagation information to edge node 410 and/or to onboard processor 442 in air vehicle 440. The signal propagation information is used by edge node 410 and/or onboard processor 442 to determine if the entire system, including an RF path, is expected to support an accuracy level and integrity needed for safe operation in landing air vehicle 440 at landing target area 450. Although a co-located or nearby monitoring station is one implementation, alternately, information about RF propagation conditions or predicted propagation conditions can be provided by other observation or forecasting systems.

For example, RF monitoring station 460 can be located in a vicinity of landing target area 450 and at a distance range that allows RF monitoring station 460 to determine current propagation characteristics of the RF signals in the area of interest. This signal propagation information from RF monitoring station 460 can be used by edge node 410 to determine the accuracy and integrity of the location information, to verify whether the landing guidance information meets a reliability threshold for safely landing air vehicle 440 at landing target area 450. If verified, edge node 410 transmits the landing guidance information to air vehicle 440 for use by onboard processor 442 in guiding air vehicle 440 to landing target area 450.

FIG. 5A is a flow diagram of a landing guidance method 500, according to one implementation. The method 500 comprises providing a network slice of a mobile communications network, such as a 5G network, with the network slice including an edge node and base station resources, and wherein the mobile communications network includes a network location management function (block 510). The method 500 provides for receiving, in the edge node, location information from the network location management function (block 520). The method 500 generates, in the edge node, landing guidance information for an air vehicle such as a AAM vehicle, UAS, UAM vehicle, VTOL vehicle, or UAV, based on the location information (block 530).

The method 500 is operative for determining an accuracy and integrity of the location information to verify if the landing guidance information meets a reliability threshold for safely landing the air vehicle at a landing target area (block 540). The determination of accuracy and integrity (block 540) may take into consideration the current local RF propagation characteristics as described further below. In one implementation, the edge node can determine the accuracy and integrity of the location information to verify if the landing guidance information is reliable enough for safely landing the air vehicle at the landing target area. In an alternative implementation, an onboard processor of the air vehicle can determine the accuracy and integrity of the location information to verify if the landing guidance information is reliable enough for safely landing the air vehicle at the landing target area.

Thereafter, method 500 initiates transmitting the landing guidance information from the edge node to the air vehicle if the landing guidance information meets the reliability threshold (block 550). The method 500 then provides for guiding the air vehicle to the landing target area using the landing guidance information (block 560).

FIG. 5B is a flow diagram of further operational steps when RF integrity monitoring is employed in the landing guidance method 500 of FIG. 5A. In this case, method 500 further comprises providing an RF monitoring station located within a predetermined range of a mobile network antenna (block 512). The predetermined range to the mobile network antenna is dependent on local site obstacles or conditions that can attenuate the 5G RF signal, cause unacceptable multi-path conditions, or otherwise render the monitored signal to be not representative of the propagation characteristics from the mobile network antenna to the air vehicle. The method 500 determines, in the RF monitoring station, signal propagation information including current propagation characteristics of RF signals within the predetermined range of the landing target area (block 522). The method 500 then transmits signal propagation information to the edge node and/or an onboard processor in the air vehicle (block 532). The signal propagation information is analyzed in the edge node and/or the onboard processor to determine if an RF path is expected to support the accuracy level and integrity needed for safe operation in landing the air vehicle at the landing target area (block 542). If the RF path is expected to support the accuracy level and integrity needed, method 500 initiates transmitting the landing guidance information from the edge node to the air vehicle as indicated above (block 550).

Figure 6:
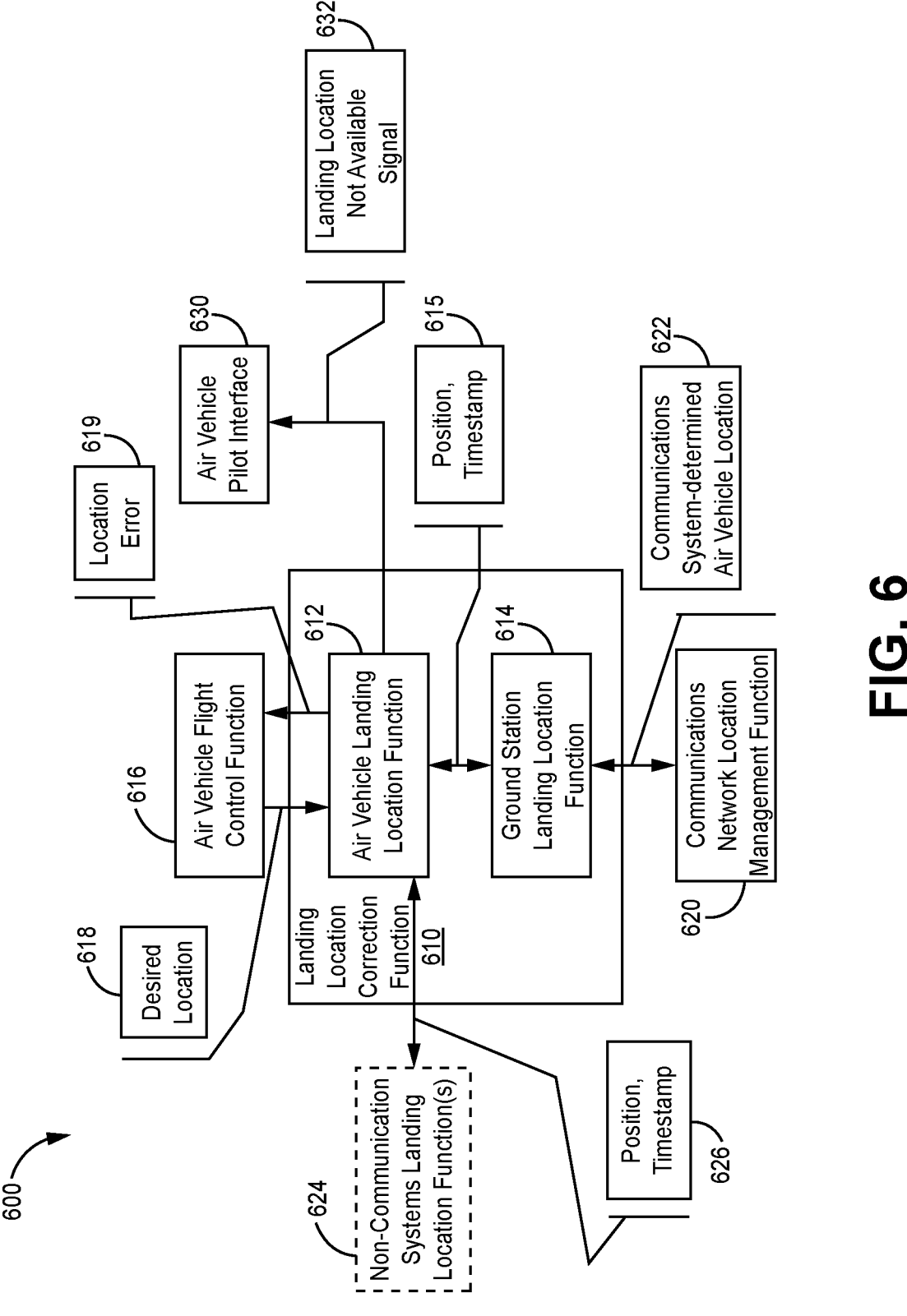
FIG. 6 is a block diagram of an example landing guidance system for an air vehicle, according to another embodiment.

FIG. 6 is a block diagram of an example landing guidance system 600 for an air vehicle, according to another embodiment. The blocks labeled as functions can be implemented in hardware and/or software. The callouts between blocks show the main data elements exchanged between the functions.

The system 600 includes a landing location correction function 610, which is operative to provide an error signal in a closed loop control for vehicle landing. The landing location correction function 610 is also operative to determine the accuracy and integrity of location information. Further details related to the closed loop control are described hereafter with respect to FIGS. 7A and 7B.

As shown in FIG. 6, landing location correction function 610 has an onboard portion that includes an air vehicle landing location function 612, which is implemented onboard the air vehicle. The landing location correction function 610 also has a ground portion that includes a ground station landing location function 614, which is implemented in a ground station, such as in a 5G edge node or other ground system. The air vehicle landing location function 612 and ground station landing location function 614 operatively communicate data with each other, such as position, timestamp information 615.

The air vehicle landing location function 612 is in operative communication with an air vehicle flight control function 616. The air vehicle landing location function 612 is operative to receive a desired location signal 618 from air vehicle flight control function 616. The air vehicle landing location function 612 is also operative to send a location error signal 619 to air vehicle flight control function 616.

The ground station landing location function 614 operatively communicates with a communications network location management function 620. The ground station landing location function 614 is operative to receive position/location information, such as a communications system-determined air vehicle location 622, from communications network location management function 620.

Optionally, air vehicle landing location function 612 operatively communicates with one or more non-communication systems landing location functions 624. The air vehicle landing location function 612 can receive position/location information such as position, timestamp information 626, from non-communication systems landing location functions 624. The non-communications system landing location functions 624 may be other conventional landing systems that are found on existing air vehicles, such as Global Positioning System (GPS) functions, or Instrument Landing Systems (ILS) functions. These optional sources of position information can be integrated into landing location correction function 610 if desired to provide a backup or enhancement of the information from communications network location management function 620.

An air vehicle pilot interface 630 is in operative communication with air vehicle landing location function 612. The air vehicle pilot interface 630 provides status information and an alarm signal to a pilot of the air vehicle. For example, a landing location not available signal 632 can be sent from air vehicle landing location function 612 to air vehicle pilot interface 630 to generate the alarm signal. The pilot may be on the air vehicle, remotely located, or can be an autonomous function rather than a human pilot.

During operation, air vehicle flight control function 616 sends desired location signal 618 to landing location correction function 610, and receives location error signal 619 back from landing location correction function 610. The air vehicle flight control function 616 uses desired location signal 618 and location error signal 619 to control the air vehicle flight path using standard flight control methods. The communications network location management function 620 uses the facilities of the 5G network or other network (e.g., LTE, 6G, WiFi, or other networks that can provide location information) to provide air vehicle location 622 to landing location correction function 610.

Figure 7A:
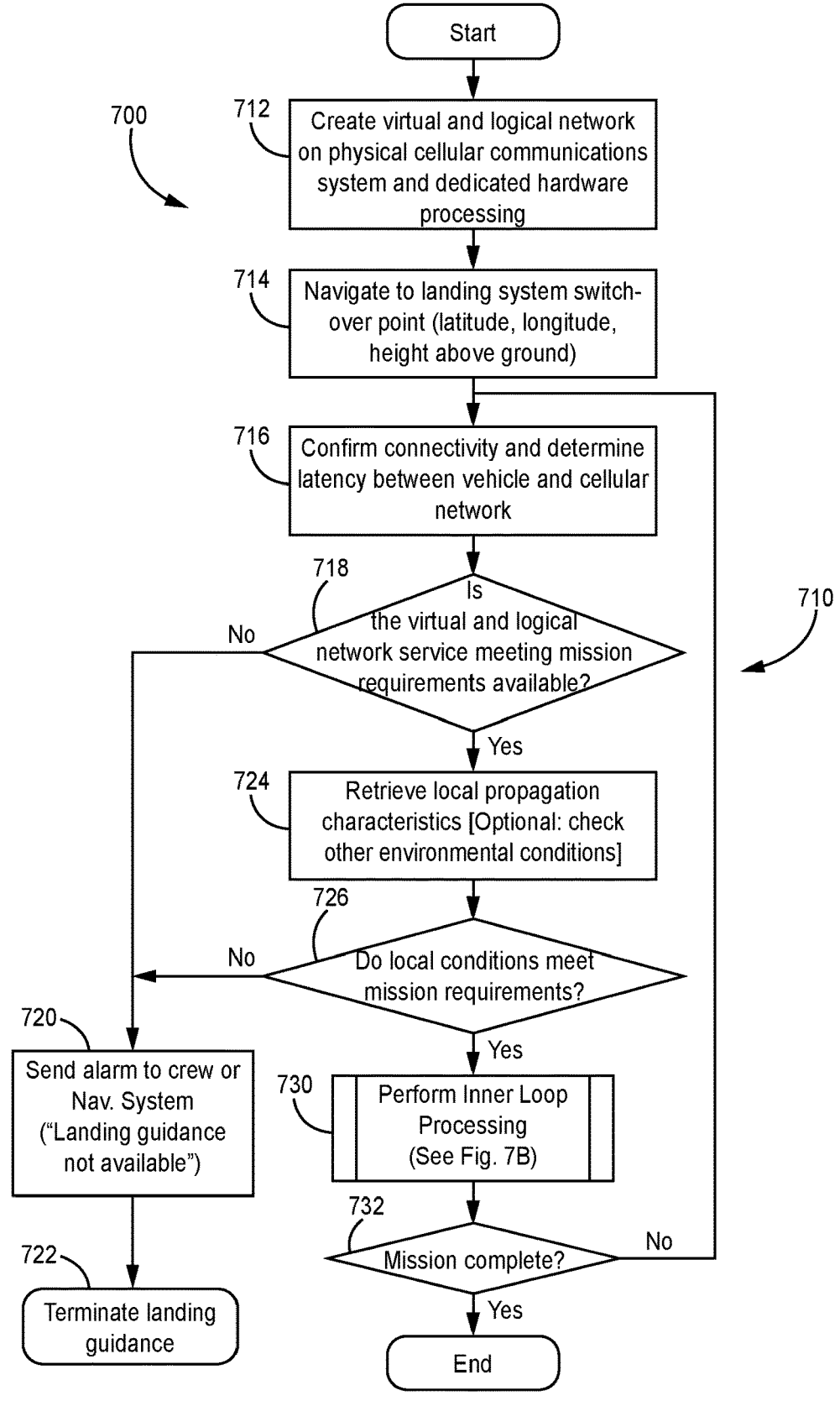
FIGS. 7A and 7B are flow diagrams of an example landing guidance method for an air vehicle, according to another implementation, which can be employed in the landing guidance system of FIG. 6.
Figure 7B:
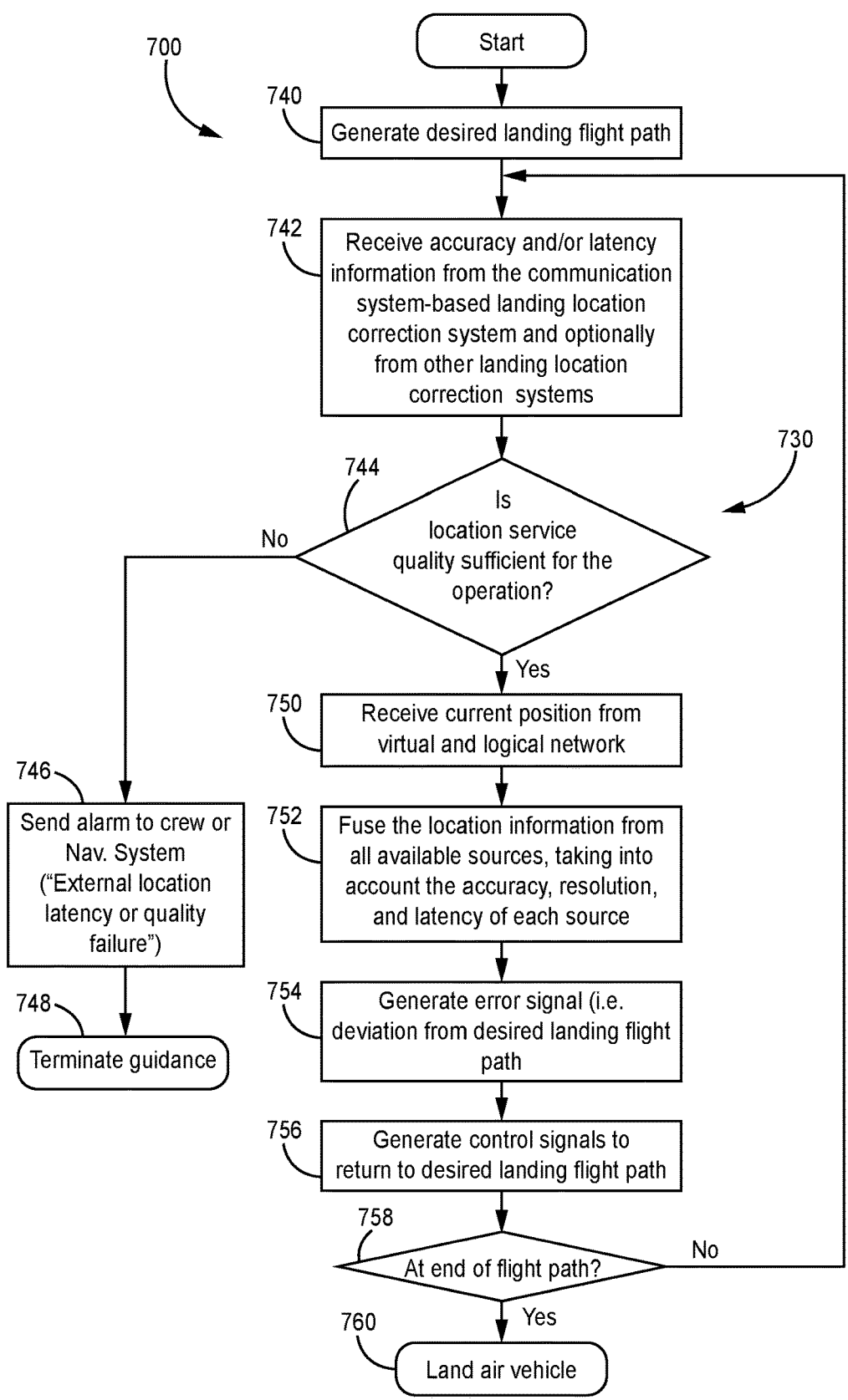

FIGS. 7A and 7B are flow diagrams of an example landing guidance method 700 for an air vehicle, according to another implementation, which can be employed in landing guidance system 600. The landing guidance method 700 generally includes an outer loop 710 that initializes the system and provides high-level control of the landing guidance operation, and an inner loop 730 that provides real-time control of the landing guidance operation. For example, outer loop 710 and inner loop 730 would be performed by landing location correction function 610 of landing guidance system 600 (FIG. 6).

FIG. 7A shows an example implementation of outer loop 710 for landing guidance method 700. At the start, outer loop 710 is operative to create a virtual and logical network on a physical cellular communications network system and dedicated hardware processing (block 712). For example, outer loop 710 can create a virtual and logical network using the network slice features of the 5G communication network, or similar features of other types of networks. Once a network slice is established, outer loop 710 continuously monitors the overall landing guidance operation according to the following steps.

Until the landing operation commences, the air vehicle navigates to a landing system switch-over point, which includes a latitude, longitude, and height above ground (block 714). For example, the air vehicle may be navigating using conventional position sources, such as GPS, as is standard for this type of vehicle. At the point where additional accuracy and/or integrity is required, the subsequent steps of method 700 are performed as follows.

The outer loop 710 confirms connectivity and determines latency between the air vehicle and the cellular network (block 716) The connectivity can be confirmed by the exchange of messages between the air vehicle and the ground (cellular) network. The local propagation characteristics can be determined by a local monitoring station such as by measuring precipitation rates to infer the level of attenuation, or by measuring RF loss in the relevant frequency bands directly. Optionally, the monitoring can include other environmental conditions relevant to the landing operation such as visibility, wind, or other air traffic that might interfere with the landing operation. The monitoring can also check for the availability and accuracy of satellite signals or other navigation systems that the air vehicle may be using for navigation and landing.

The outer loop 710 then determines whether a virtual and logical network service meeting mission requirements is available (block 718). If not, an alarm is sent to the crew or navigation system (e.g., message "Landing Guidance not Available") (block 720), and the landing guidance is terminated (block 722). If outer loop 710 determines that a virtual and logical network service meeting mission requirements is available (at block 718), then outer loop 710 retrieves local propagation characteristics (e.g., rain or other weather data) (block 724). Optionally, other local environmental conditions can be checked (e.g., wind, visibility, air traffic, etc.).

The outer loop 710 then determines whether the local conditions meet mission requirements (block 726). If not, an alarm is sent to the crew or navigation system (block 720), and the landing guidance is terminated (block 722). If outer loop 710 determines that the local conditions meet mission requirements (at block 726), processing for inner loop 730 is performed, as described below with respect to FIG. 7B.

For example, if the network service is available and the local conditions meet the operational requirements, outer loop 710 can trigger the processing for inner loop 730 that performs the closed loop control of the landing operation. The outer loop 710 continues to monitor the status of the network connection as well as the local environmental conditions, and if any faults or degradation that would prevent the safe landing of the air vehicle is detected, an alarm is generated and sent to the operator and/or the navigation system on the air vehicle so that appropriate alternate action, such as aborting the landing and performing a go-around maneuver can be initiated (block 720). In this condition, the air vehicle will also revert to the standard navigation system (e.g., GPS or other satellite navigation system).

The outer loop 710 then determines whether the landing mission is complete (block 732). If not, outer loop 710 returns to block 716, and continues to monitor the status of the network connection as well as the local environmental conditions. Once outer loop 710 determines that the landing mission is complete (at block 732), outer loop 710 is ended.

FIG. 7B shows an example implementation of inner loop 730 for landing guidance method 700. The inner loop 730 is operative to perform closed loop control of the landing operation. At the start, inner loop 730 generates a desired landing flight path (block 740), such as a continuous three-dimensional (3D) path for the air vehicle's current position to the landing point. The inner loop 730 receives accuracy and/or latency information from the communication system-based landing location correction function, and optionally from other landing location correction systems (block 742). For example, in a real-time processing loop, the system will receive from the network a position accuracy estimate and will monitor the latency of messages to and from the network.

The inner loop 730 then determines if the location service quality is sufficient for the landing operation (e.g., update rate greater than 1/s, accuracy less than 1 m) (block 744). If not, an alarm is sent to the crew or navigation system (e.g., message "External location latency or quality failure") (block 746), and the landing guidance is terminated (block 748). For example, if the latency exceeds a minimum requirement or the accuracy falls below a required minimum (e.g., 1 meter, 95%), an alarm is generated and the guidance is terminated. If this event occurs, the air vehicle flight control system determines the next steps, which can include: (1) flying to a safe holding position to wait and monitor the landing site conditions to determine if another landing approach can be attempted after some time has passed; (2) navigating to an alternate landing location that might have better landing conditions; or (3) return to the original point of departure.

If inner loop 730 determines that the location service quality is sufficient for the landing operation (at block 744), then inner loop 730 receives a current position from the virtual and logical network (block 750). The inner loop 730 then fuses the location information from all available sources, taking into account the accuracy, resolution, and latency of each source (block 752). An error signal is then generated (i.e., deviation from the desired landing flight path) (block 754). The inner loop 730 then generates control signals to return the air vehicle to the desired landing flight path (block 756). For example, in the case where the latency and accuracy are good, inner loop 730 will receive the position from the network, compare this position to a desired position on the landing flight path, and use the difference to calculate an error signal. Standard control methods, well known to those skilled in the art of aerial vehicle control, can then be used to return the vehicle to the desired flight path.

The inner loop 730 then finally determines if the air vehicle is at the end of the flight path and in a position to land (block 758). If yes, the air vehicle is landed and inner loop 730 terminates (block 760). If the air vehicle has not reached the end of the flight path (at block 758), inner loop 730 is continued by returning to block 742.

The processing steps of outer loop 710 and inner loop 730 are independent of each other except for specific interfaces. For example, in method 700, outer loop 710 triggers inner loop 730 and inner loop 730 is terminated either due to latency or position quality error, or completion of the landing. Because the processing rates and data inputs of outer loop 710 and inner loop 730 are different, it may be advantageous to place inner loop 730 on the aerial vehicle and outer loop 710 in an edge node of the 5G network or other network. However, this is not required. For example, a very small, lightweight aerial vehicle might have minimum onboard processing capability, and thus both outer loop 710 and inner loop 730 can be implemented in a ground station. Conversely, a larger air vehicle with more processing capability can implement both outer loop 710 and inner loop 730 onboard the vehicle for maximum independence from the network.

In various embodiments, the present system can be implemented in hardware devices with embedded software that can be connected securely to the cloud via wired or wireless connection. The processing units and/or other computational devices used in the method and system described herein may be implemented using software, firmware, hardware, or appropriate combinations thereof. The processing unit and/or other computational devices may be supplemented by, or incorporated in, specially designed application-specific integrated circuits (ASICs) or field programmable gate arrays (FPGAs). In some implementations, the processing unit and/or other computational devices may communicate through an additional transceiver with other computing devices outside of the navigation system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

Example Embodiments

Example 1 includes a landing guidance system, comprising: at least one edge node that operatively communicates with a mobile communications network, wherein the mobile communications network includes a network location management function; and at least one processor onboard an air vehicle, the at least one processor in operative communication with the edge node; wherein the at least one edge node is operative to provide landing guidance information to the air vehicle by a method comprising: receiving location information from the network location management function; generating the landing guidance information for the air vehicle based on the location information; and transmitting the landing guidance information to the air vehicle if the landing guidance information meets a reliability threshold; wherein the at least one processor is operative to guide the air vehicle to the landing target area using the landing guidance information.

Example 2 includes the system of Example 1, wherein the at least one edge node is further operative to determine an accuracy and integrity of the location information, to verify whether the landing guidance information meets the reliability threshold for safely landing the air vehicle at the landing target area.

Example 3 includes the system of Example 1, wherein the at least one processor onboard the air vehicle is operative to determine an accuracy and integrity of the location information, to verify whether the landing guidance information meets the reliability threshold for safely landing the air vehicle at the landing target area.

Example 4 includes the system of any of Examples 1-3, wherein: the at least one edge node is part of a network slice of the mobile communications network; and the at least one edge node has access to allocated resources in the mobile communications network.

Example 5 includes the system of Example 4, wherein the allocated resources in the mobile communications network include access to one or more mmWave beamforming antennas, and radio channel selection.

Example 6 includes the system of any of Examples 1-5, wherein the mobile communications network is a 5G network.

Example 7 includes the system of any of Examples 1-6, wherein the at least one processor onboard the air vehicle is operative to interface with control electronics and/or a pilot to guide the air vehicle to the landing target area using the landing guidance information.

Example 8 includes the system of any of Examples 1-7, wherein the at least one edge node is operative to calculate deviations and feedback signals to guide the air vehicle to the landing target area.

Example 9 includes the system of any of Examples 1-7, wherein the at least one processor onboard the air vehicle is operative to calculate deviations and feedback signals to guide the air vehicle to the landing target area.

Example 10 includes the system of any of Examples 1-9, wherein the air vehicle comprises an Advanced Air Mobility (AAM) vehicle, an Unmanned Air Systems (UAS) vehicle, an Urban Air Mobility (UAM) vehicle, a vertical take-off and landing (VTOL) vehicle, or an Unmanned Aerial Vehicle (UAV).

Example 11 includes the system of any of Examples 1-10, further comprising: a radio frequency (RF) monitoring station located within a predetermined range of a mobile network antenna that allows the RF monitoring station to determine current propagation characteristics of the RF signals within the predetermined range of the landing target area.

Example 12 includes the system of Example 11, wherein: the RF monitoring station provides the propagation characteristics of the RF signals as signal propagation information to the at least one edge node and/or the at least one processor onboard the air vehicle; and the signal propagation information is used by the at least one edge node and/or the at least one processor to determine if the system, including an RF path, is expected to support an accuracy level and integrity needed for safe operation in landing the air vehicle at the landing target area.

Example 13 includes a method for landing guidance, the method comprising: providing a network slice of a mobile communications network, the network slice including an edge node, wherein the mobile communications network includes a network location management function; receiving, in the edge node, location information from the network location management function; generating, in the edge node, landing guidance information for an air vehicle based on the location information; determining an accuracy and integrity of the location information, to verify whether the landing guidance information meets a reliability threshold for safely landing the air vehicle at a landing target area; transmitting the landing guidance information from the edge node to the air vehicle if the landing guidance information meets the reliability threshold; and guiding the air vehicle to the landing target area using the landing guidance information.

Example 14 includes the method of Example 13, wherein the accuracy and integrity of the location information is determined in the edge node.

Example 15 includes the method of Example 13, wherein the accuracy and integrity of the location information is determined in an onboard processor of the air vehicle.

Example 16 includes the method of any of Examples 13-15, wherein the mobile communications network is a 5G network.

Example 17 includes a method for landing guidance of an air vehicle, the method comprising: providing an outer loop protocol that initializes a high-level control of a landing guidance operation, and an inner loop protocol that provides real-time control of the landing guidance operation; wherein the outer loop protocol comprises: creating a virtual and logical network on a cellular communications network and a processor; when the air vehicle navigates to a landing system switch-over point, confirming a network connection and determining latency between the air vehicle and the cellular communications network; determining whether a virtual and logical network service meeting landing mission requirements is available; if the virtual and logical network service meeting the landing mission requirements is available, then retrieving local propagation characteristics; determining whether local environmental conditions corresponding to the local propagation characteristics meet the landing mission requirements; if the local environmental conditions meet the landing mission requirements, and initiating the inner loop protocol to provide real-time control of the landing guidance operation; wherein the outer loop protocol continues to monitor a status of the network connection and the local environmental conditions until a determination is made that the landing mission is complete.

Example 18 includes the method of Example 17, wherein if the virtual and logical network service meeting the landing mission requirements is not available, or the local environmental conditions do not meet the landing mission requirements, the method further comprises: sending an alarm to a crew or navigation system of the air vehicle indicating that landing guidance is not available; and terminating the landing guidance operation.

Example 19 includes the method of any of Examples 17-18, wherein the inner loop protocol comprises: generating a desired landing flight path for the air vehicle; receiving accuracy and/or latency information from a communication system-based landing location correction function; determining if a location service quality is sufficient for the landing guidance operation; if the location service quality is sufficient for the landing guidance operation, receiving a current position of the air vehicle from the virtual and logical network; fusing location information from all available sources, taking into account the accuracy, resolution, and latency of each source; generating an error signal corresponding to a deviation from the desired landing flight path; and generating one or more control signals to return the air vehicle to the desired landing flight path; wherein the inner loop protocol continues to monitor the accuracy and/or latency information and whether the location service quality is sufficient, until a determination is made that the air vehicle is at an end of the desired landing flight path and in a position to land.

Example 20 includes the method of Example 19, wherein if the location service quality is not sufficient for the landing guidance operation, the method further comprises: sending an alarm to a crew or a navigation system of the air vehicle indicating an external location latency or quality failure; and terminating the landing guidance operation.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A landing guidance system, comprising:
at least one edge node that is ground-based and operatively communicates with a mobile communications network, wherein the mobile communications network includes a network location management function, wherein the at least one edge node is part of a network slice of the mobile communications network;
a base station in operative communication with the at least one edge node; and
at least one processor onboard an air vehicle, the at least one processor in operative communication with the at least one edge node through the base station;
wherein the at least one edge node is operative to provide landing guidance information to the air vehicle by a method comprising:
receiving location information from the network location management function;
generating the landing guidance information for the air vehicle based on the location information; and
transmitting the landing guidance information to the air vehicle, through the base station, when the landing guidance information meets a reliability threshold;
wherein the at least one edge node, or the at least one processor, is operative to determine an accuracy and integrity of the location information, to verify whether the landing guidance information meets the reliability threshold, for safely landing the air vehicle at a landing target area;
wherein the at least one processor is operative to interface with air vehicle control electronics in real-time to guide the air vehicle to the landing target area using the landing guidance information.

2. The system of claim 1, wherein:
the at least one edge node has access to allocated resources in the mobile communications network.

3. The system of claim 2, wherein the allocated resources in the mobile communications network include access to one or more mmWave beamforming antennas, and radio channel selection.

4. The system of claim 1, wherein the mobile communications network is a 5G network.

5. The system of claim 1, wherein the at least one processor onboard the air vehicle is operative to interface with control electronics and/or a pilot to guide the air vehicle to the landing target area using the landing guidance information.

6. The system of claim 1, wherein the at least one edge node is operative to calculate deviations and feedback signals to guide the air vehicle to the landing target area.

7. The system of claim 1, wherein the at least one processor onboard the air vehicle is operative to calculate deviations and feedback signals to guide the air vehicle to the landing target area.

8. The system of claim 1, wherein the air vehicle comprises an Advanced Air Mobility (AAM) vehicle, an Unmanned Air Systems (UAS) vehicle, an Urban Air Mobility (UAM) vehicle, a vertical take-off and landing (VTOL) vehicle, or an Unmanned Aerial Vehicle (UAV).

9. The system of claim 1, further comprising:
a radio frequency (RF) monitoring station located within a predetermined range of a mobile network antenna that allows the RF monitoring station to determine current propagation characteristics of RF signals within the predetermined range of the landing target area.

10. The system of claim 9, wherein:

the RF monitoring station provides the propagation characteristics of the RF signals as signal propagation information to the at least one edge node and/or the at least one processor onboard the air vehicle; and the signal propagation information is used by the at least one edge node and/or the at least one processor to determine if the system, including an RF path, is expected to support an accuracy level and integrity needed for safe operation in landing the air vehicle at the landing target area.

11. A method for landing guidance, the method comprising:

providing a network slice of a mobile communications network, the network slice including an edge node that is ground-based, wherein the mobile communications network includes a network location management function;

receiving, in the edge node, location information from the network location management function;

generating, in the edge node, landing guidance information for an air vehicle based on the location information;

determining an accuracy and integrity of the location information, to verify whether the landing guidance information meets a reliability threshold for safely landing the air vehicle at a landing target area;

transmitting the landing guidance information from the edge node to the air vehicle, through a base station, when the landing guidance information meets the reliability threshold;

guiding the air vehicle to the landing target area using the landing guidance information; and calculating deviations and feedback signals in real-time to control landing of the air vehicle at the landing target area.

12. The method of claim 11, wherein the accuracy and integrity of the location information is determined in the edge node.

13. The method of claim 11, wherein the accuracy and integrity of the location information is determined in an onboard processor of the air vehicle.

14. The method of claim 11, wherein the mobile communications network is a 5G network.

15. A method for landing guidance of an air vehicle, the method comprising:

providing an outer loop protocol that initializes a high-level control of a landing guidance operation, and an inner loop protocol that provides real-time control of the landing guidance operation;

wherein the outer loop protocol comprises:

creating a virtual and logical network on a cellular communications network and a processor;

when the air vehicle navigates to a landing system switch-over point, confirming a network connection and determining latency between the air vehicle and the cellular communications network;

determining whether a virtual and logical network service meeting landing mission requirements is available;

if the virtual and logical network service meeting the landing mission requirements is available, then retrieving local propagation characteristics;

determining whether local environmental conditions corresponding to the local propagation characteristics meet the landing mission requirements; and if the local environmental conditions meet the landing mission requirements, initiating the inner loop protocol to provide real-time control of the landing guidance operation;

wherein the outer loop protocol continues to monitor a status of the network connection and the local environmental conditions until a determination is made that the landing mission is complete.

16. The method of claim 15, wherein if the virtual and logical network service meeting the landing mission requirements is not available, or the local environmental conditions do not meet the landing mission requirements, the method further comprises:

sending an alarm to a crew or navigation system of the air vehicle indicating that landing guidance is not available; and terminating the landing guidance operation.

17. The method of claim 15, wherein the inner loop protocol comprises:

generating a desired landing flight path for the air vehicle;

receiving accuracy and/or latency information from a communication system-based landing location correction function;

determining if a location service quality is sufficient for the landing guidance operation;

if the location service quality is sufficient for the landing guidance operation, receiving a current position of the air vehicle from the virtual and logical network;

fusing location information from all available sources, taking into account the accuracy, resolution, and latency of each source;

generating an error signal corresponding to a deviation from the desired landing flight path; and generating one or more control signals to return the air vehicle to the desired landing flight path;

wherein the inner loop protocol continues to monitor the accuracy and/or latency information and whether the location service quality is sufficient, until a determination is made that the air vehicle is at an end of the desired landing flight path and in a position to land.

18. The method of claim 17, wherein if the location service quality is not sufficient for the landing guidance operation, the method further comprises:

sending an alarm to a crew or a navigation system of the air vehicle indicating an external location latency or quality failure; and terminating the landing guidance operation.

* * * * *